United States Patent
Sato

(10) Patent No.: US 7,796,279 B2
(45) Date of Patent: Sep. 14, 2010

(54) IMAGE PROCESSING EQUIPMENT, IMAGE PROCESSING METHOD, COMPUTER PROGRAM, AND RECORDING MEDIUM

(75) Inventor: Mineko Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 998 days.

(21) Appl. No.: 11/391,415

(22) Filed: Mar. 29, 2006

(65) Prior Publication Data
US 2006/0221404 A1    Oct. 5, 2006

(30) Foreign Application Priority Data
Mar. 31, 2005 (JP) .............................. 2005-104366
Mar. 27, 2006 (JP) .............................. 2006-086312

(51) Int. Cl.
*G06F 15/00* (2006.01)
*G06K 9/36* (2006.01)
(52) U.S. Cl. ..................................... 358/1.12; 382/232
(58) Field of Classification Search ................. 358/1.2, 358/1.15, 3.26, 1.18, 1.8, 464, 1.14, 1.16; 382/199, 201, 232; 709/223, 224, 220, 231, 709/219, 203, 227, 201; 705/1, 7, 37, 26, 705/28, 14.66, 80; 715/764, 733, 744; 348/138
See application file for complete search history.

(56) References Cited

U.S. PATENT DOCUMENTS

| 5,443,417 A | 8/1995 | Schimweg |
| 5,722,031 A | 2/1998 | Fujii et al. |
| 6,256,462 B1 * | 7/2001 | Maeda et al. .................. 399/71 |

FOREIGN PATENT DOCUMENTS

| JP | 6-155283 A | 6/1994 |
| JP | 8-62736 A | 3/1996 |
| JP | 10-63143 A | 3/1998 |
| JP | 2000-221769 A | 8/2000 |
| JP | 2001-232912 A | 8/2001 |

OTHER PUBLICATIONS

Japanese Office Action dated Dec. 11, 2009 in Japanese Application No. 2006-086312.
Japanese Office Action dated Aug. 3, 2009 in Japanese Application No. 2006-086312.
English-language translation of Japanese Patent Document No. 2000-221769 A, laid-opened date Aug. 11, 2000.

\* cited by examiner

*Primary Examiner*—Saeid Ebrahimi Dehkordy
(74) *Attorney, Agent, or Firm*—Fitzpatrick, Cella, Harper & Scinto

(57) ABSTRACT

This invention solves problems such as density shortage, toner scattering, and toner fog when images whose density is biased are successively printed. In order to achieve this purpose, an image processing equipment comprising an input unit which inputs a print job, an image processing unit which generates print data corresponding to the input print job and supplies the print data to an image forming unit, a detector which detects bias of the amount of toner application distribution in the print data, and a control unit which controls said image processing unit so as to rotate an output direction of the print data on the basis of a detection result of said detector.

18 Claims, 16 Drawing Sheets

FAR SIDE

NEAR SIDE

DEVELOPING UNIT

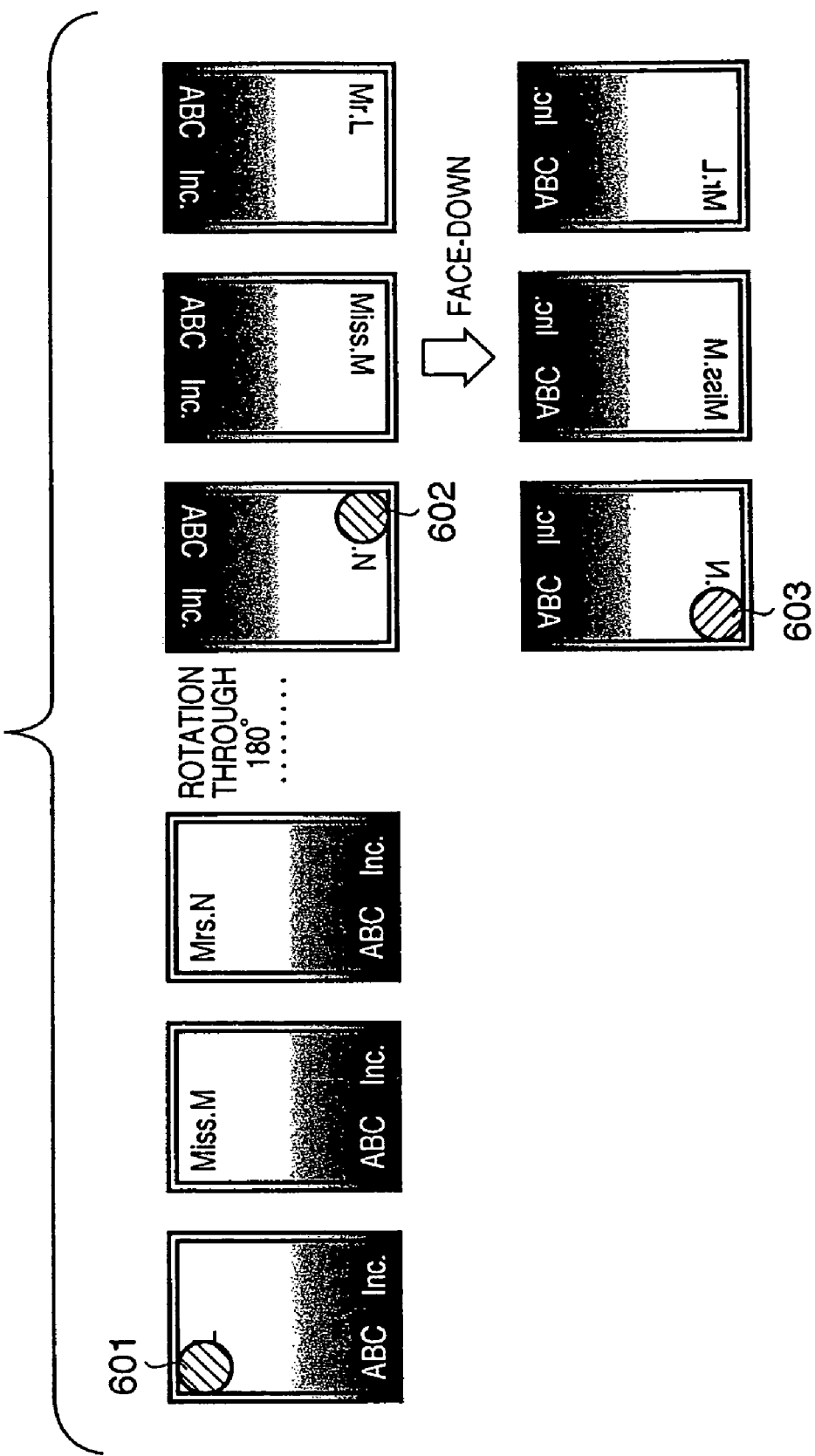

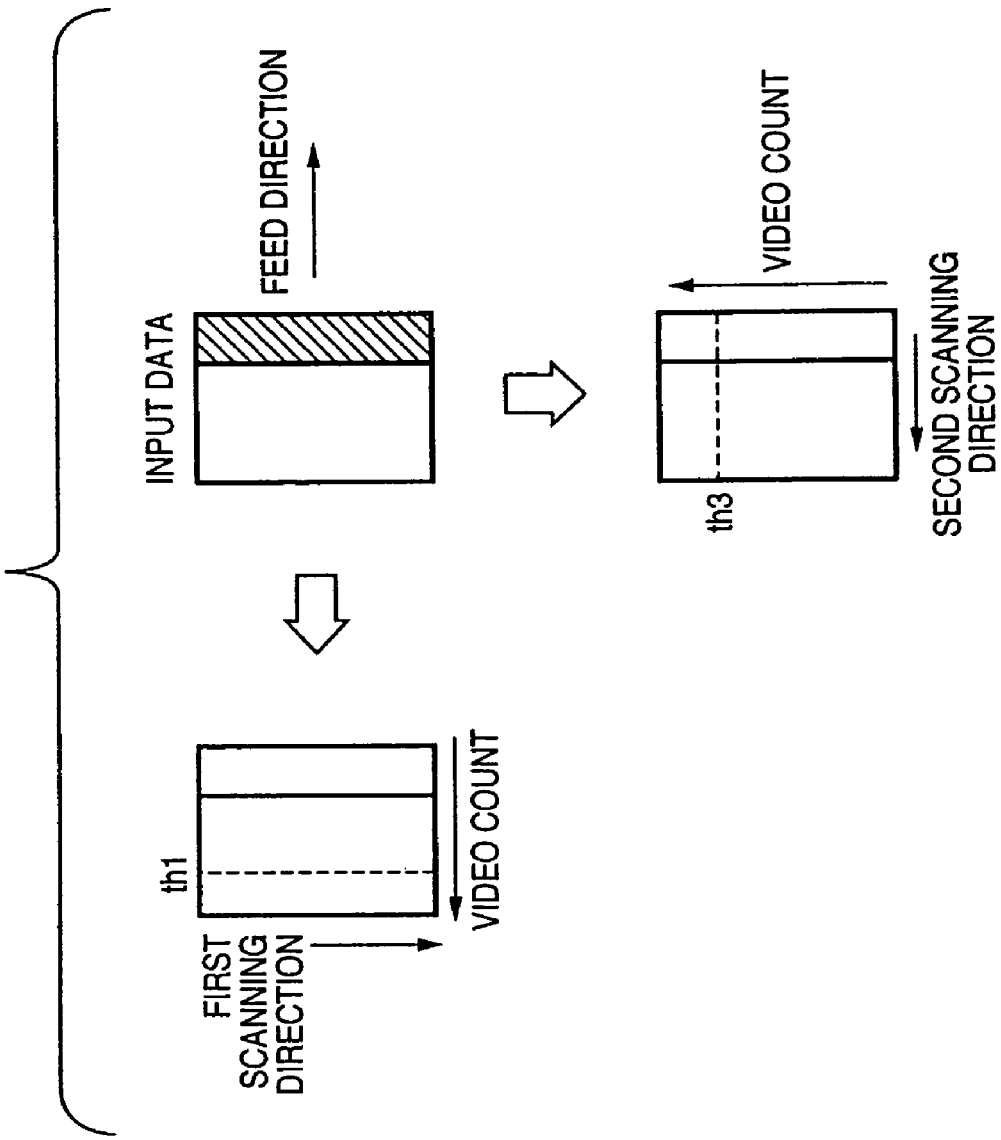

IMAGE PROCESSING EQUIPMENT, IMAGE PROCESSING METHOD, COMPUTER PROGRAM, AND RECORDING MEDIUM

FIELD OF THE INVENTION

The present invention relates to an image processing technique and, more particularly, to image processing when images whose density is biased are successively printed.

BACKGROUND OF THE INVENTION

When an electrophotographic printer outputs an image whose density is, for example, high on the far side in a direction perpendicular to the paper convey direction and low on the near side, the toner consumption amount changes between the far and near portions of the developing unit, as shown in FIG. 1. That is, the toner consumption amount is large on the far portion in the developing unit and small on the near portion. Especially when print jobs of images whose density is biased continue, the difference in toner consumption amount becomes large. At this time, if a sensor which detects the toner amount is arranged on the near side in the developing unit, it determines that toner remains, though the remaining toner is running short on the far side. Thus, the developing unit is not replenished with toner, no sufficient amount of toner can be supplied to an area of print paper that corresponds to the far side, and no expected density can be attained. To the contrary, if the sensor is arranged on the far side in the developing unit, it determines that no toner remains. In this case, the developing unit is replenished with toner, and toner may be excessive on the near side where the consumption amount is large. Excessive toner may cause contamination by toner scattering, and so-called toner fog on print paper.

When the toner amount on print paper is biased, the fixing unit may also pose a problem. For example, when the toner amount is large on the far side on a toner image on print paper, the fixing unit is deprived of a larger amount of heat on the far side in the fixing unit. The temperature decreases on the far side in the fixing unit, and toner on the far side of print paper does not satisfactorily fuse, resulting in a fixing error. If the fixing temperature is increased to prevent the temperature drop, the temperature on the near side in the fixing unit also rises, and the fixing unit degrades, also causing a fixing error.

Further, the photoconductor drum may also generate a problem. For example, when images whose amount of toner application is biased are successively formed, a memory phenomenon occurs on the photoconductor drum, and a ghost caused by the memory phenomenon may appear in a subsequent print job. Note that the memory phenomenon means a state in which the electrical current potential of the photoconductor drum cannot be reset to the initial value and a previous latent image remains.

A problem may occur even when print jobs of images in which the density is different between the leading and trailing edges of print paper in the paper convey direction continue. Particularly when the density at the leading edge is high, separation between the fixing unit and print paper may fail after toner fixing, and print paper may be wound around the fixing unit.

In this manner, an error is highly likely to occur in successive print jobs of images in which the density is different between the far and near sides and between the leading and trailing edges in the paper convey direction. Especially in variable print output, identical background images are successively output, so the above-described errors occur at higher possibility.

SUMMARY OF THE INVENTION

It is an object of the present invention to solve problems when images whose density is biased are successively printed.

As a means for achieving the above object, the present invention comprises the following arrangement. That is, an image processing equipment comprises a receiving unit which receives a print job from an external apparatus, an image processing unit which generates print data corresponding to the print job and supplies the print data to an image forming unit, a counter which counts a video count value of the print data generated by the image processing unit in a first scanning direction or a second scanning direction, an acquisition unit which, when a print job which is formed from master data serving as a fixed image and variable data serving as a variable image is designated, acquires a video count value of the mater data from the counter, a comparator which compares the video count value acquired by the acquisition unit with a predetermined threshold, and a control unit which, when the video count value exceeds the threshold as a result of the comparison, controls the image processing unit so as to rotate an output direction of the print data every predetermined number of print sheets.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a view showing a combination of rotation of the image output direction and face-down/up; and FIG. 15 is a view showing an example of image data when the video count value in the second scanning direction is large.

DETAILED DESCRIPTION OF THE PREFERRED EMBODIMENTS

Preferred embodiments of the present invention will be described in detail below with reference to the accompanying drawings. Building components described in the following embodiments are merely examples, and the scope of the present invention is not limited to them.

First Embodiment

Figure 1:
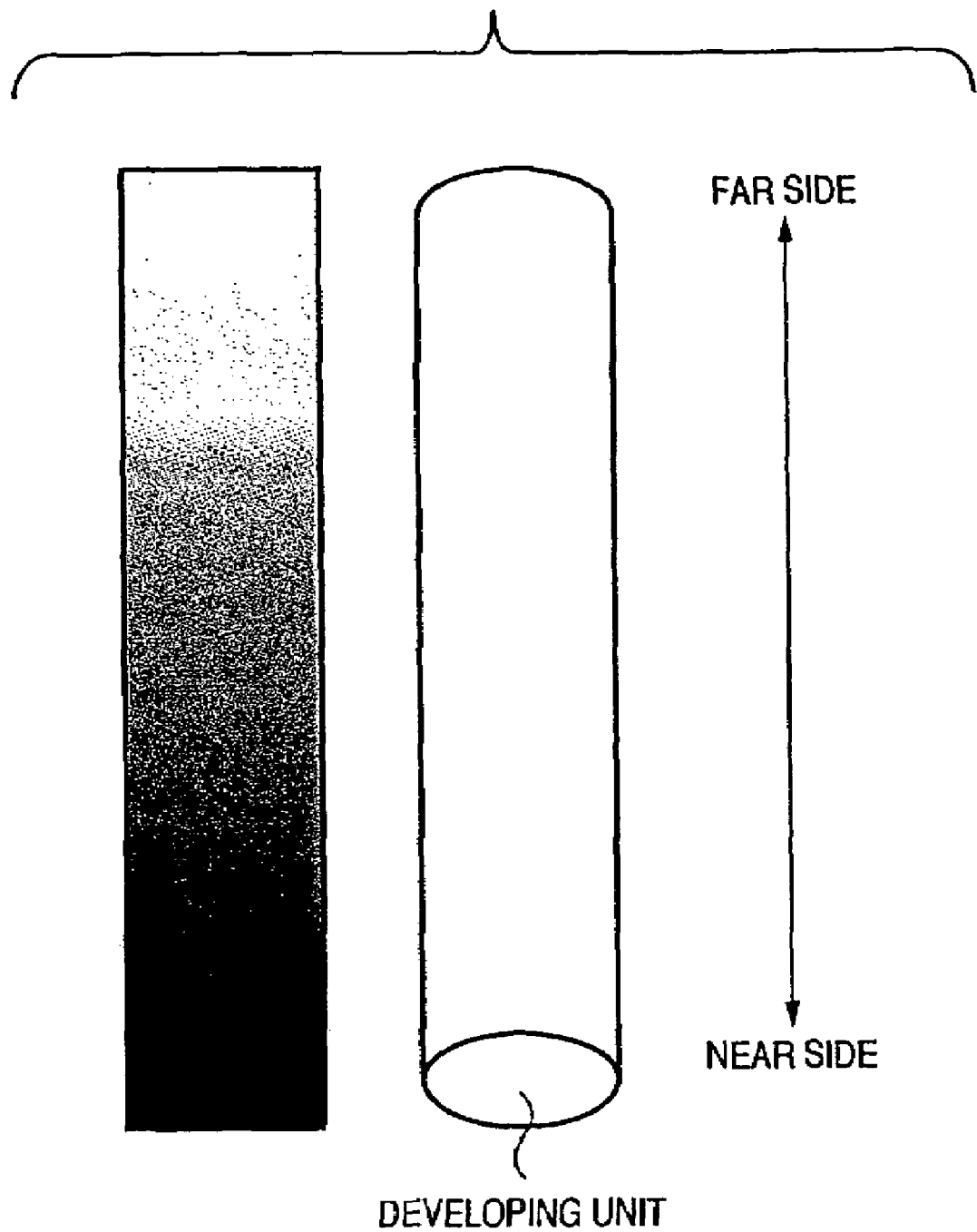
FIG. 1 is a view for explaining the bias of the toner consumption amount in a developing unit.
Figure 2:
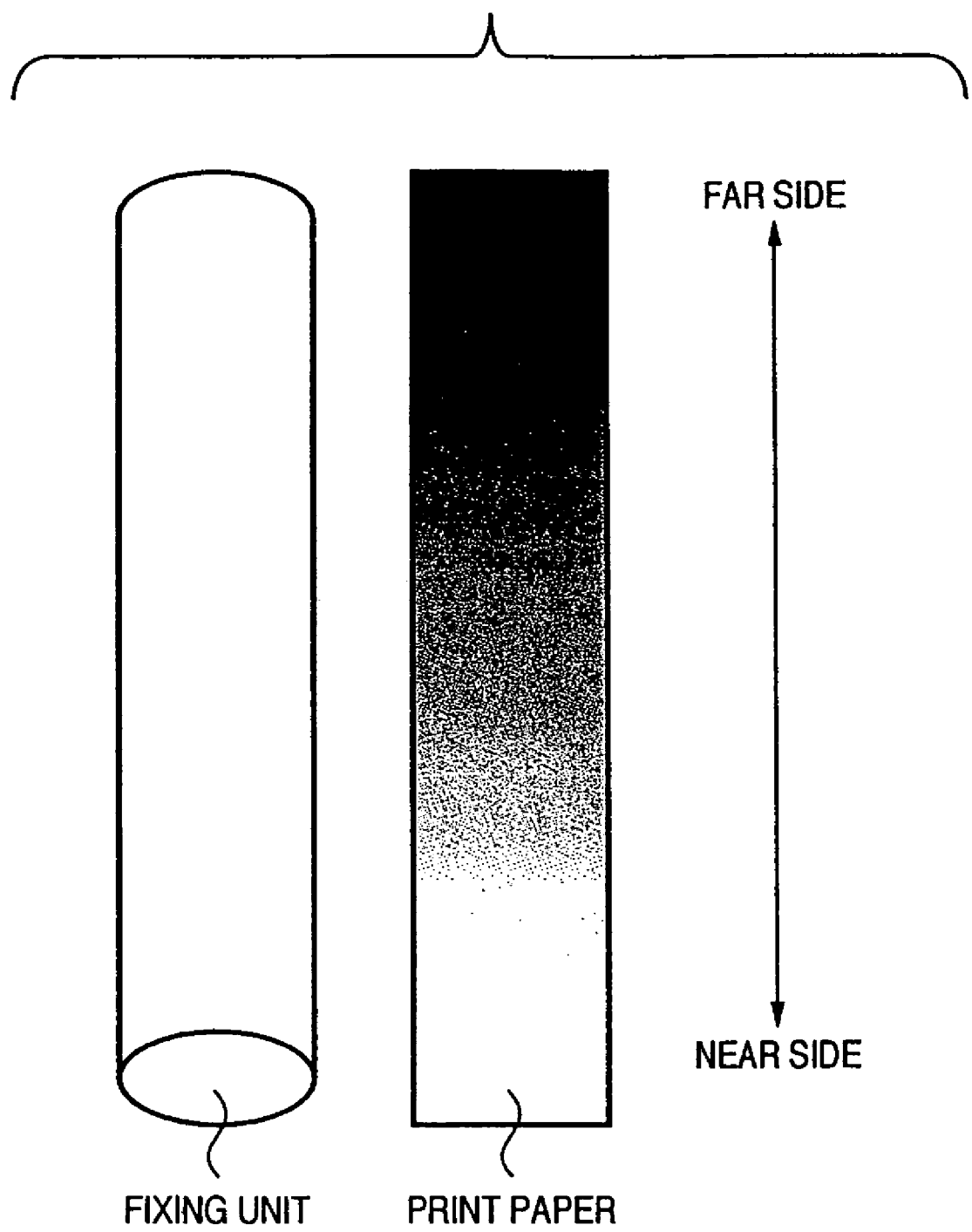
FIG. 2 is a view for explaining the bias of the fixing temperature in a fixing unit.
Figure 3:
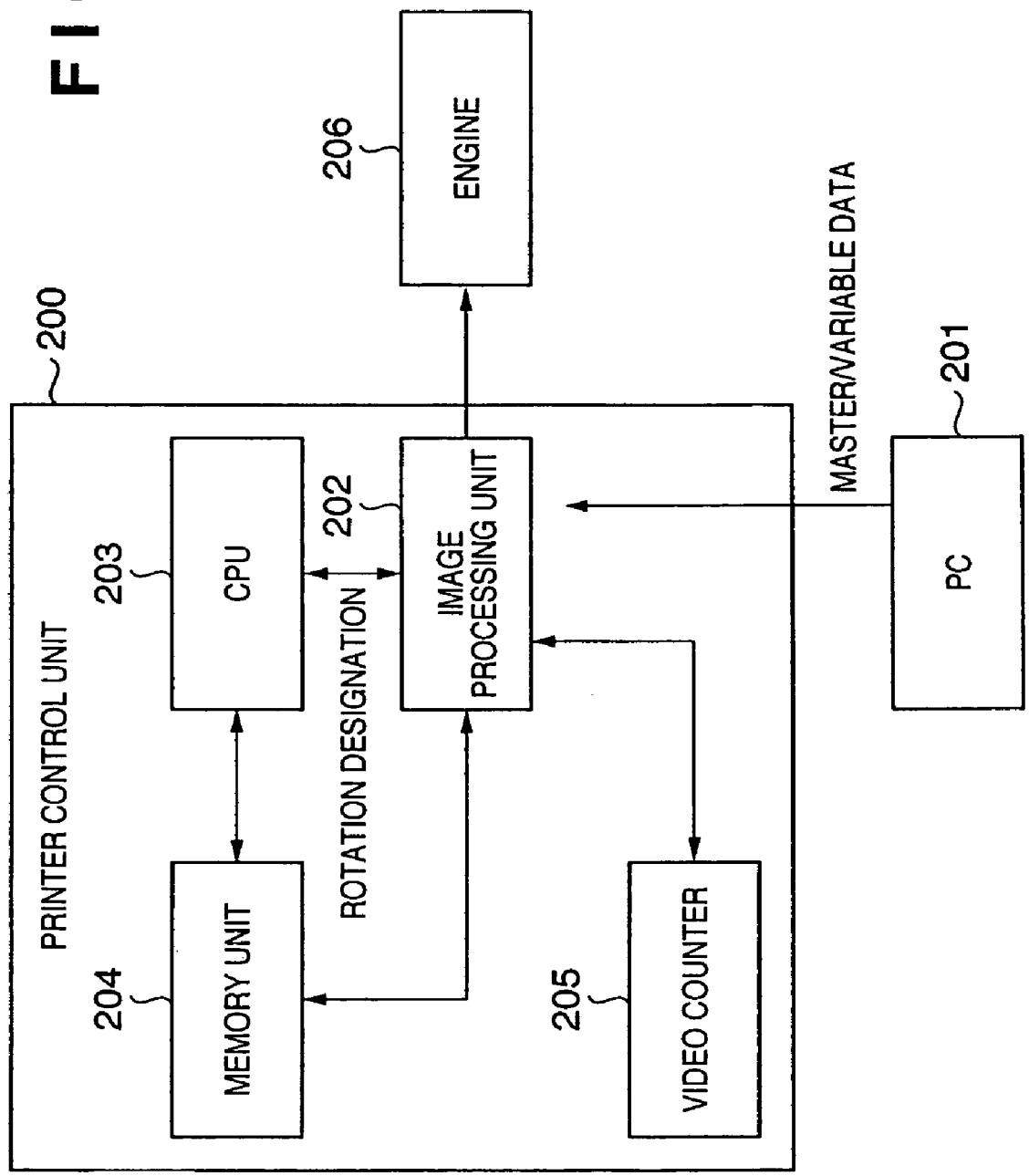
FIG. 3 is a block diagram showing the internal arrangement of an electrophotographic printer.

FIG. 3 is a block diagram showing the internal arrangement of an electrophotographic printer.

Image data created by a personal computer (PC) 201 is sent to a printer control unit 200 via a printer driver which runs in the PC 201. A CPU 203 of the printer control unit 200 stores the received image data in a memory unit 204, and instructs an image processing unit 202 on print processing. The image processing unit 202 performs image processing including color processing such as halftone processing (e.g., screen processing) for image data stored in the memory unit 204. At this time, the image processing unit 202 determines the application amounts of C(Cyan), M(Magenta), Y(Yellow), and K(Black) toners by using a video counter 205, and sends C, M, Y, and K data corresponding to the determined application amounts to a printer engine (image forming unit) 206. Note that the video counter 205 is a counter which measures the toner amount (amount of toner application) of an image. The CPU 203 may predict the use amount of toner by using the count value of the video counter 205, and feed back the predicted use amount as toner replenishment information.

The printer engine 206 irradiates a charged photoconductor drum or photoconductor belt with a laser beam from a laser scanner driver in accordance with C, M, Y, and K data corresponding to image data determined by the image processing unit 202, thereby forming latent images. The latent images are developed into toner images by C, M, Y, and K toners. The toner images are transferred onto print paper directly or via intermediate transfer belt. The toner images are fixed onto the print paper by the fixing unit, and the print paper bearing the image is output.

Note that the printer driver of the PC 201 allows designating the number of output images, the number of copies, sorting, stapling, and variable printing.

Figure 4:
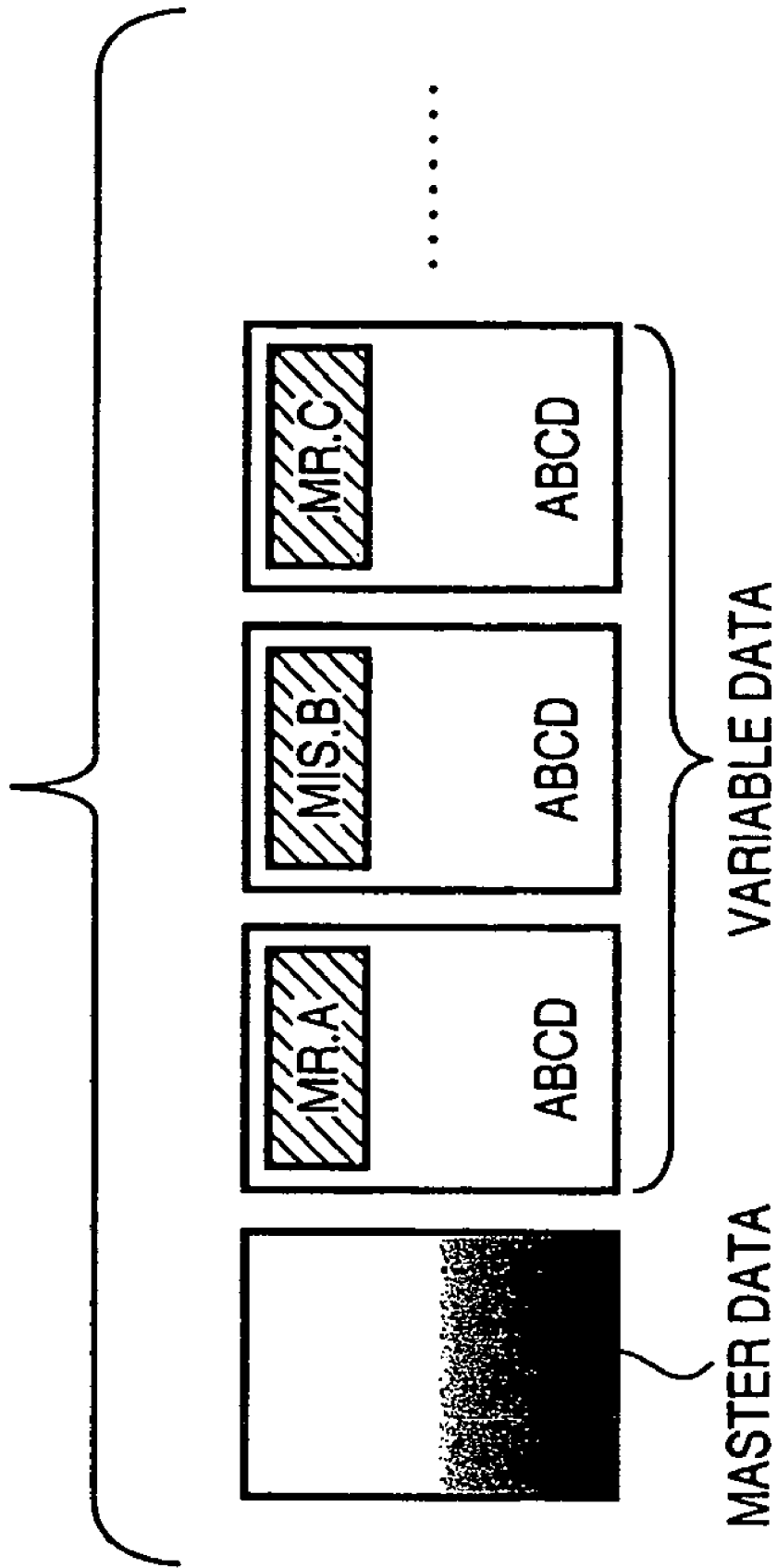
FIG. 4 is a view for explaining variable printing.

FIG. 4 is a view for explaining variable printing. Variable printing is to composite variable overlay image data (to be referred to as variable data hereinafter) on fixed background image data and output the composited image. The background data (to be referred to as master data hereinafter) may be transmitted from the printer driver at the same time as variable data or held in the memory unit 204 of the printer control unit 200. In some cases, a plurality of types of master data are prepared and switched in accordance with variable data.

Figure 5:
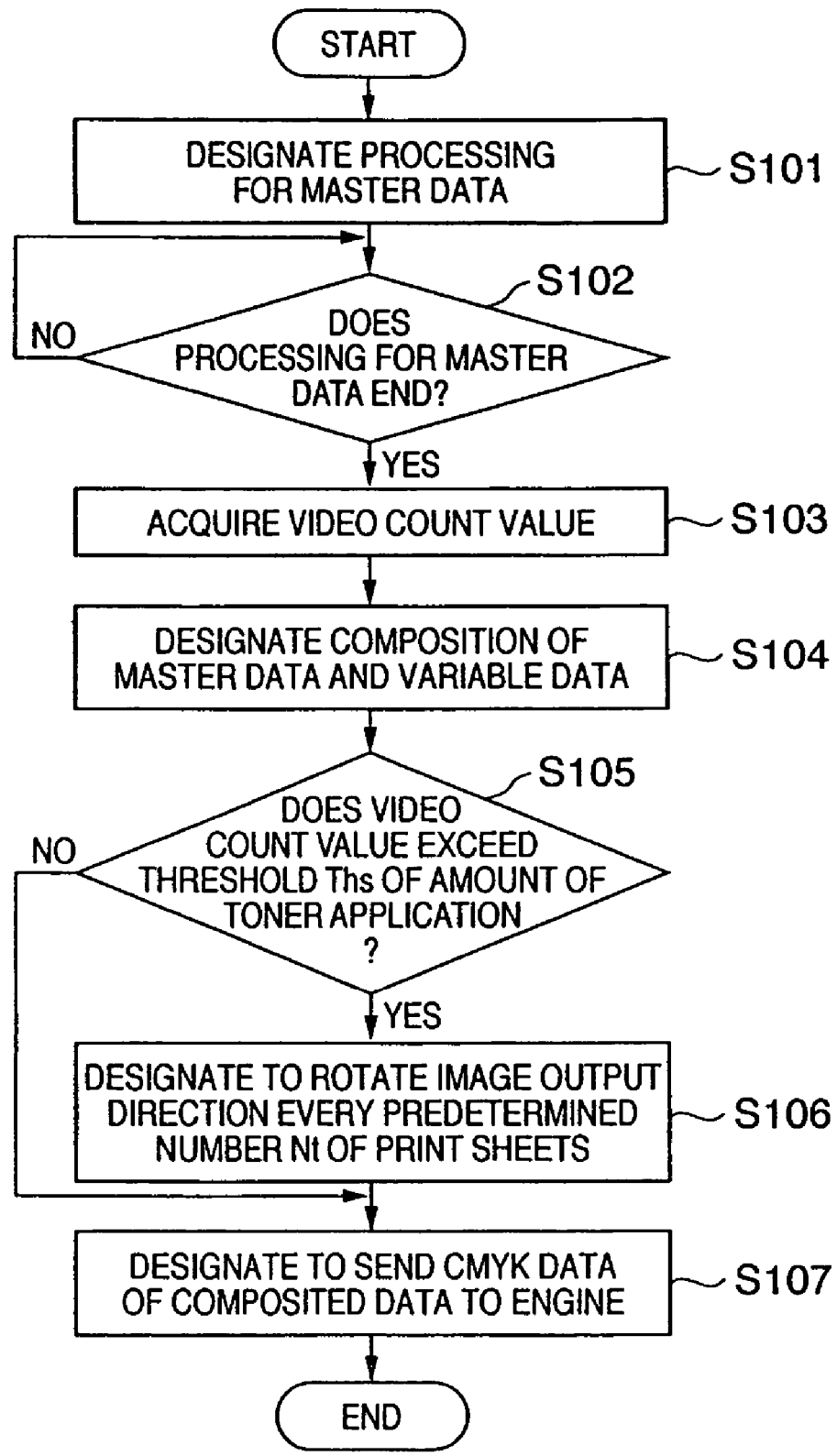
FIG. 5 is a flowchart showing processing executed by a CPU.

FIG. 5 is a flowchart showing processing executed by the CPU 203. This processing is executed when the PC 201 designates variable printing.

When variable printing is designated, the CPU 203 instructs the image processing unit 202 to process master data (S101). If the image processing unit 202 notifies the CPU 203 that image processing for the master data ends (YES in S102), the CPU 203 acquires a count value (amount of toner application) from the video counter 205, and stores it in a predetermined area of the memory unit 204 (S103). After the CPU 203 acquires the count value and stores it in the memory unit 204, the count value of the video counter 205 is initialized (cleared).

Figure 6:
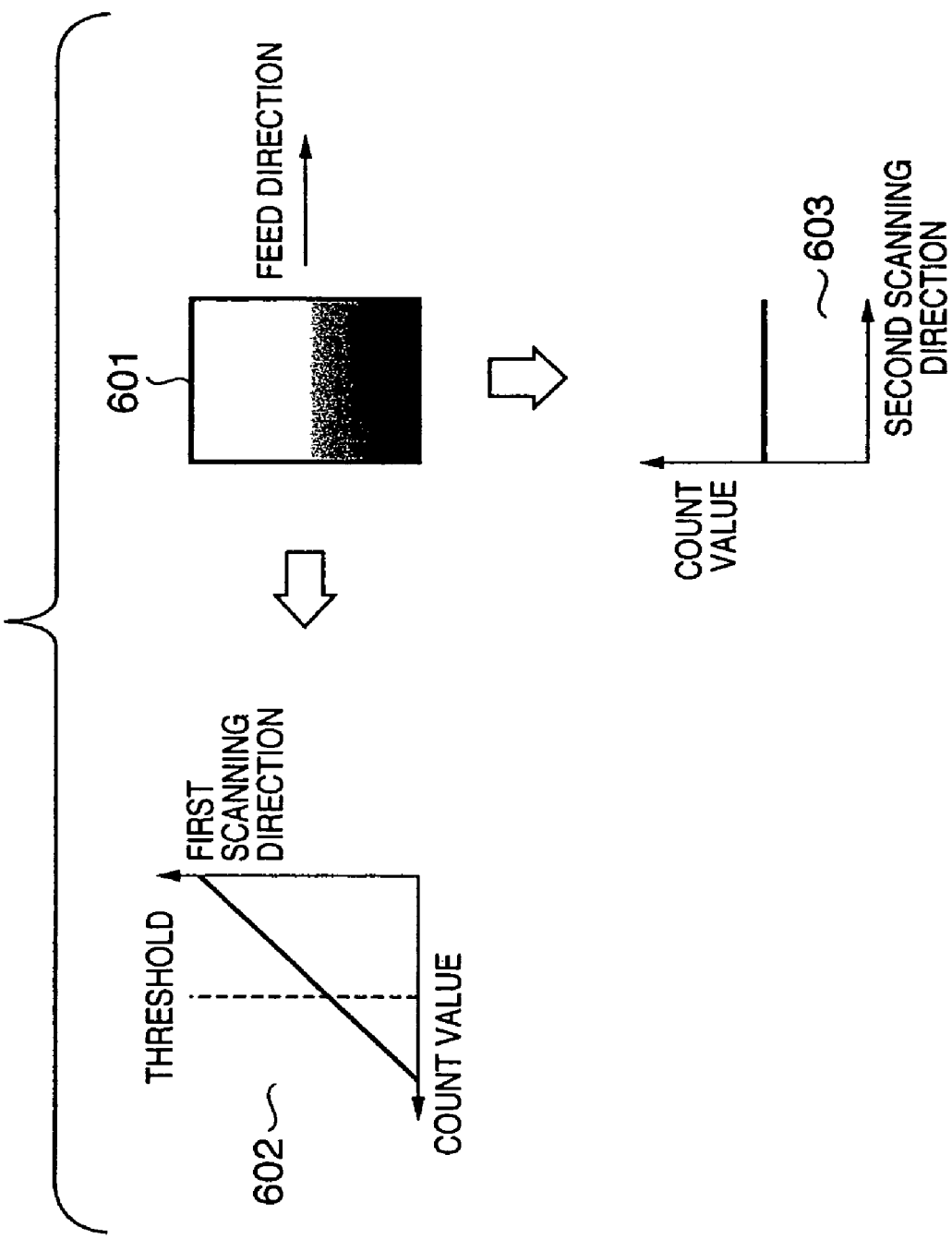
FIG. 6 is a view showing a state in which video data of master data are counted separately in the second and first scanning directions.

FIG. 6 is a view showing the result of accumulating and counting the video count values of respective pixels in the second and first scanning directions for image data of master data 601. The first scanning direction is a direction perpendicular to the image data feed direction, and the second scanning direction is a direction parallel to the data feed direction. The density of the master data 601 is biased in the first scanning direction, so a cumulative video count value 602 in the first scanning direction has an inclination, but a cumulative video count value 603 in the second scanning direction is almost constant. Note that image data is counted for each color component.

The CPU 203 instructs the image processing unit 202 to composite the master data, and variable data sent from the PC 201 (S104).

The CPU 203 determines whether Ms exceeds a threshold (e.g., 80%) Ths (S105). In this case, Ms represents the cumulative video count (amount of toner application) value of a single color in the first scanning direction. In S105, it may be determined whether Mm exceeds a threshold (e.g., 180%) Thm. In this case, Mm represents the total cumulative video count (amount of toner application) value of the four C, M, Y, and K colors in the first scanning direction. As the cumulative video count (amount of toner application) values Ms and Mm, cumulative video count values in the second scanning direction may be adopted. In addition, in S105, the CPU 203 detects bias of amount of toner application distribution in master data. As a result, when an amount of toner application is biased to a particular direction, advanced to S106. On the other hand, when an amount of toner application is not biased, may be advanced to S107.

If Ms does not exceed the threshold (Ms≦Ths), the CPU 203 instructs the image processing unit 202 to send CMYK data corresponding to the composited data to the engine 206 (S107).

If Ms exceeds the threshold (Ms>Ths), the CPU 203 instructs the image processing unit 202 to rotate the output direction of the composited data every predetermined number Nt of print sheets (e.g., 10, 50, or 100 print sheets) (S106). Then, the CPU 203 instructs the image processing unit 202 to send CMYK data corresponding to the composited data to the engine 206 (S107). The image processing unit 202 rotates the output direction of the composited data every predetermined number Nt of print sheets, and sends corresponding CMYK data to the engine 206.

For an engine 206 in which the orientation of print paper to be conveyed is fixed, the rotation angle is set to 180°. For an engine 206 capable of conveyance in the portrait and landscape orientations, like "A4 portrait" and "A4 landscape", the rotation angle is not limited to 180° and is set at a pitch of 90° (90°→180°→270°→0°). The portrait/landscape orientation of print paper is also changed in accordance with the rotation angle.

Figure 7A:
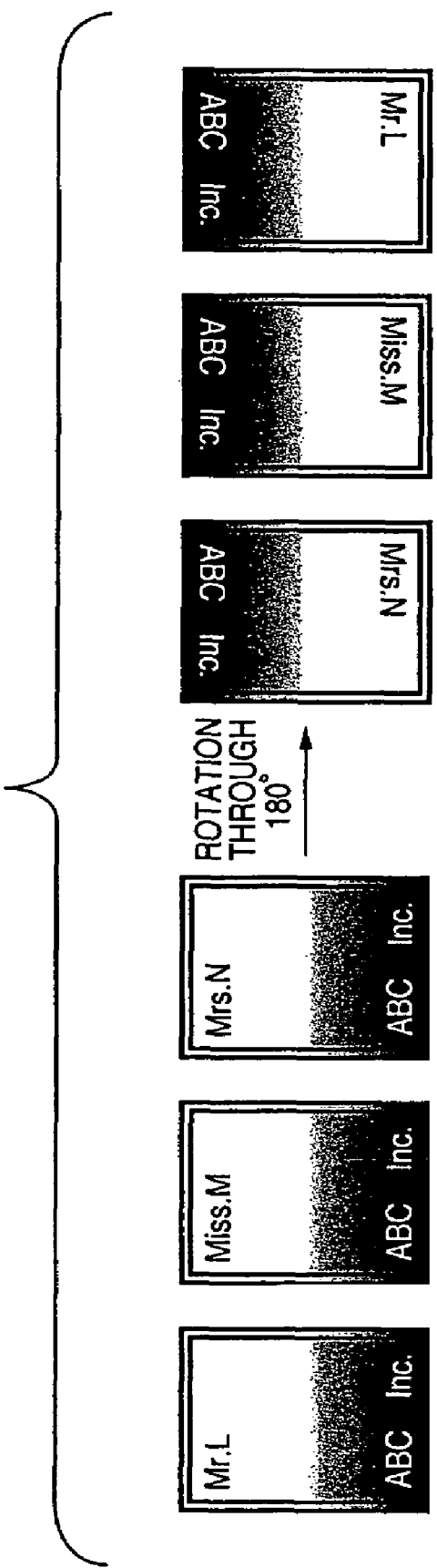
FIG. 7A is a view showing an example of rotating the image output direction through 180°.
Figure 7B:
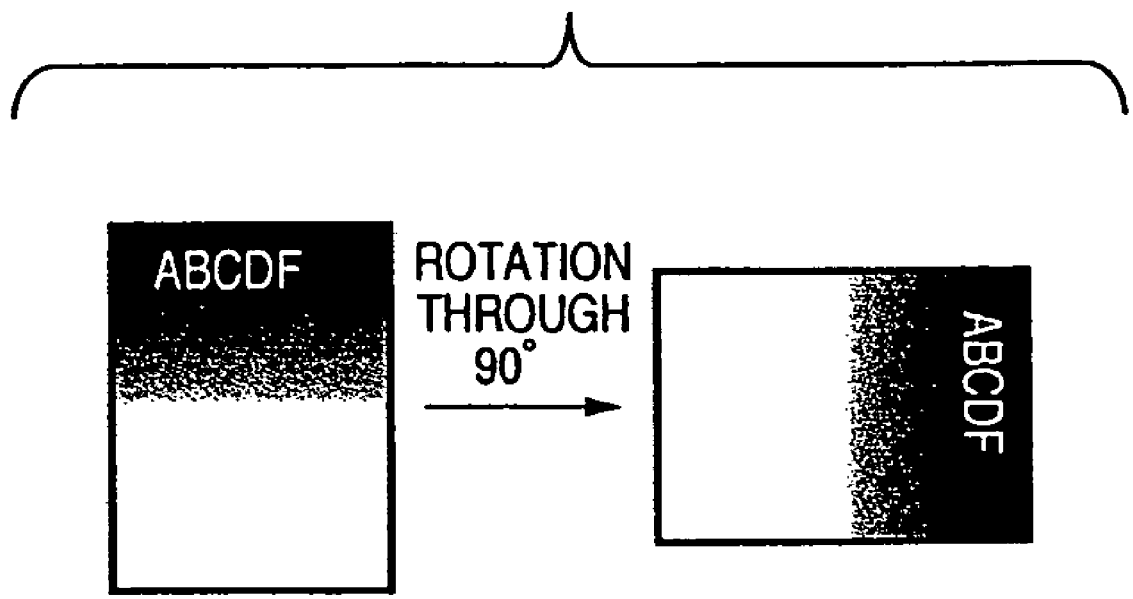
FIG. 7B is a view showing an example of rotating the image output direction through 90°.

FIG. 7A is a view showing an example of rotating the image output direction through 180°. FIG. 7B is a view showing an example of rotating the image output direction through 90°. Rotation of the image output direction means rotation of the image orientation. When image data is extracted from the memory unit 204 to the image processing unit 202, it may be rotated through a predetermined angle.

Note that the thresholds Ths and Thm are properly set on the basis of the result of preliminary measurement and the like. If the predetermined number Nt of print sheets is excessively small, sorting and stapling become difficult, which influences the performance of the apparatus. To prevent this, the predetermined number Nt of print sheets is preferably set to a relatively large value such as 50 or 100 print sheets.

In this manner, when variable printing is designated and the amount of toner application of master data is large, the image orientation is rotated every predetermined number Nt of print sheets. Various problems described above that are caused by the density bias of a background image can be solved, and high-quality images can be stably printed.

Second Embodiment

Image processing according to the second embodiment of the present invention will be described. In the second embodiment, the same reference numerals as in the first embodiment denote substantially the same building components, and a detailed description thereof will be omitted.

Figure 8:
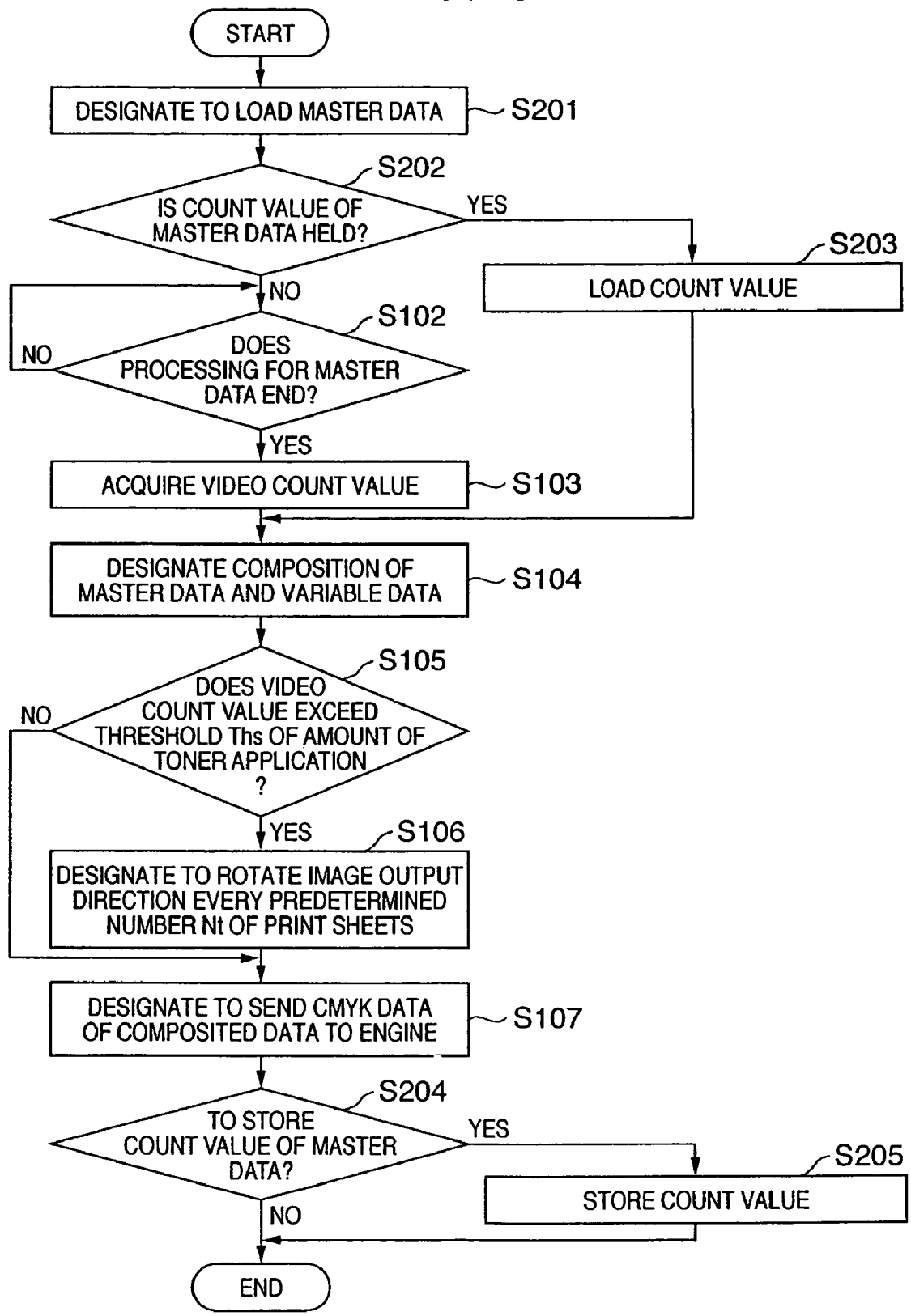
FIG. 8 is a flowchart showing processing executed by the CPU according to the second embodiment.

FIG. 8 is a flowchart showing processing executed by a CPU 203. This processing is executed when a PC 201 designates variable printing using master data which is stored in a memory unit 204 in advance.

When variable printing is designated, the CPU 203 instructs an image processing unit 202 to load (and process) master data (S201). The CPU 203 determines whether the count value of master data is held in the memory unit 204 together with the master data (S202). If no count value is held, processing from steps S102 to S107 is executed, similar to the first embodiment. Then, the CPU 203 determines whether to store a count value (S204). The CPU 203 stores the acquired count value in the memory unit 204 in association with the master data (S205).

If the count value of the master data is held in the memory unit 204, the CPU 203 reads out the count value (S203). Similar to the first embodiment, processing from steps S104 to S107 is executed.

When master data is stored in the memory unit 204, the count value of the master data can also be stored in the memory unit 204.

Accordingly, the second embodiment can obtain the same effects as those of the first embodiment. For master data whose count value has already been held, no count value need be acquired from the video counter 205, so the processing load of the CPU 203 can be reduced.

Third Embodiment

Image processing according to the third embodiment of the present invention will be described. In the third embodiment, the same reference numerals as in the first and second embodiments denote substantially the same building components, and a detailed description thereof will be omitted.

The first and second embodiments have described an example in which, when variable printing is designated, the image output direction is rotated in accordance with the video count value of master data. The third embodiment will describe an example in which the image output direction is rotated in accordance with the cumulative video count value of a predetermined number of image data in the first or second scanning direction or the specific area, regardless of the type of print job such as variable printing.

Figure 9:
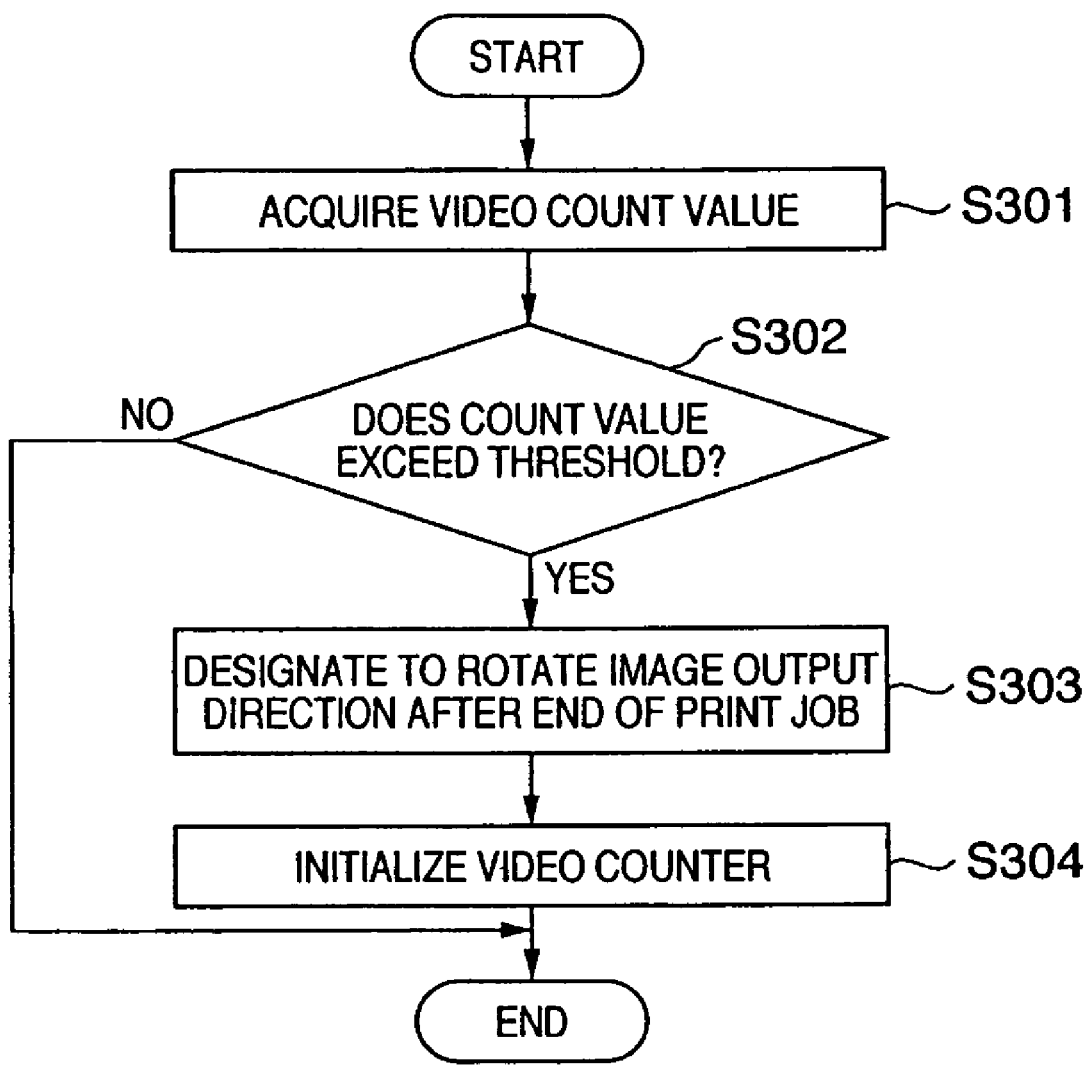
FIG. 9 is a flowchart showing image processing according to the third embodiment.

FIG. 9 is a flowchart showing image processing according to the third embodiment that is executed by a CPU 203.

The CPU 203 acquires a count value from a video counter 205 for each print job and every predetermined number of print sheets (e.g., 10 or 20 sheets) (S301). The CPU 203 determines whether a count value Is of a single color exceeds a predetermined threshold Is(max) of an engine 206, and determines whether the total count value Im of the four colors exceeds a predetermined threshold Im(max) of the engine 206 (S302). Note that the count value of the video counter 205 is not initialized until rotation of the image output direction (to be described later) is designated. The count value of the video counter 205 represents a cumulative value after the instruction is issued.

If the count value exceeds either threshold (Is>Is(max) or Im>Im(max)), the CPU 203 instructs an image processing unit 202 to rotate the image output direction after the current print job ends (S303). Then, the CPU 203 initializes the video counter 205 (S304). After the instruction, the image processing unit 202 rotates the image output direction at the start of a new print job. Note that Is(max) and Im(max) are properly set on the basis of the result of preliminary measurement and the like.

As described above, when the cumulative value of the count value (amount of toner application) exceeds the threshold, the image output direction is rotated. Various problems described above that are caused by the density bias of an image can be solved, and high-quality images can be stably printed.

Note that the image output direction may also be rotated immediately after the cumulative value of the count value exceeds the threshold. However, if the image orientation is rotated during continuous printing, sorting and stapling become difficult, which influences the performance of the apparatus. To prevent this, the image output direction is preferably rotated at the start of a new print job. The image output direction may also be rotated every predetermined number of print sheets.

Fourth Embodiment

Image processing according to the fourth embodiment of the present invention will be described. In the fourth embodiment, the same reference numerals as in the first to third embodiments denote substantially the same building components, and a detailed description thereof will be omitted.

Figure 10:
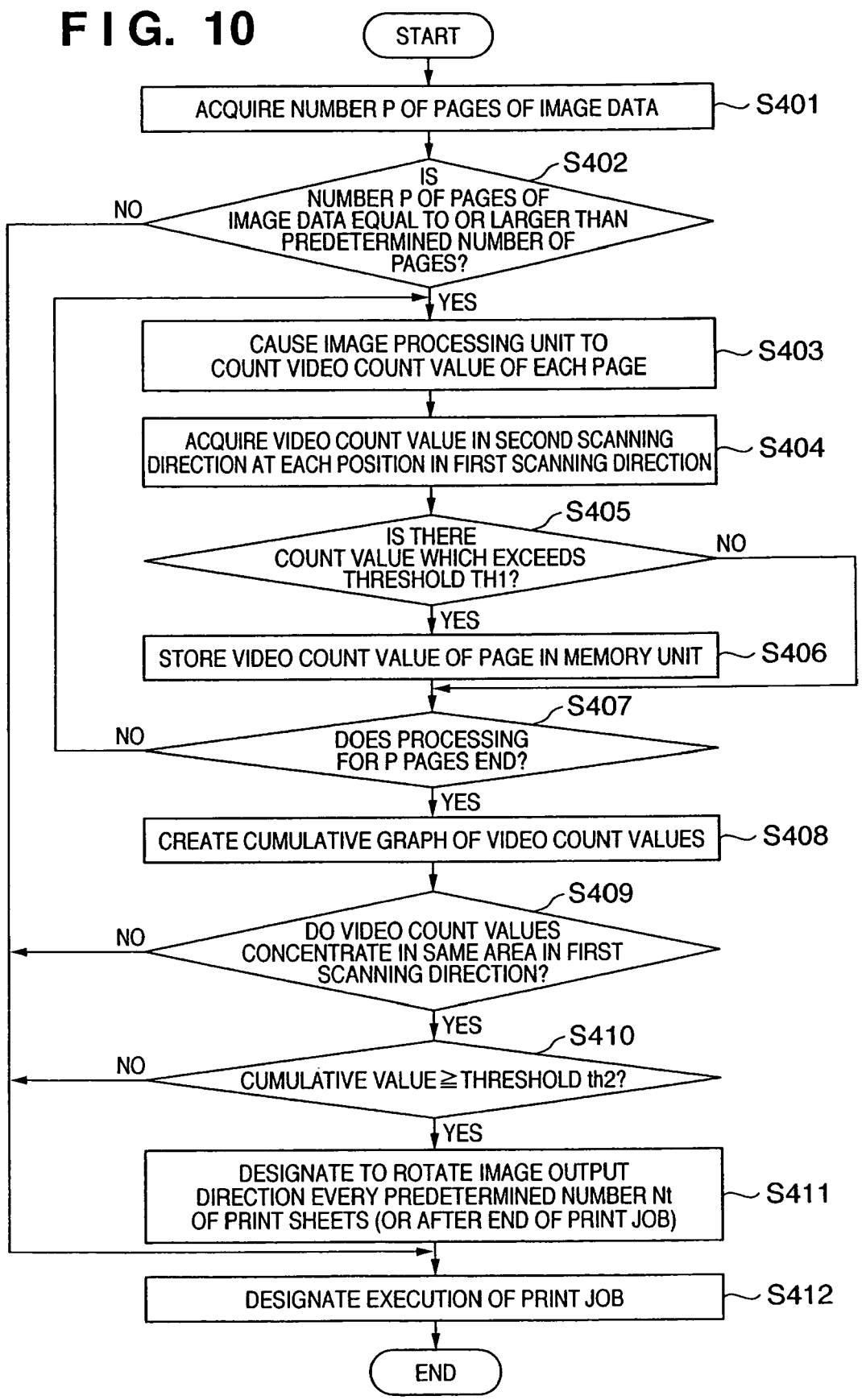
FIG. 10 is a flowchart showing processing executed by the CPU according to the fourth embodiment.

FIG. 10 is a flowchart showing image processing according to the fourth embodiment that is executed by a CPU 203.

The CPU 203 acquires a number P of pages of image data subjected to printing designated by a PC 201 (S401). The CPU 203 determines whether the number P of pages of the image data is equal to or larger than a predetermined number of pages (S402). If the number P of pages is equal to or larger than the predetermined number of pages, the CPU 203 executes processing from S403 to S411. If the number P of pages of the image data is smaller than the predetermined number of pages, the CPU 203 instructs an image processing unit 202 to execute a print job (S412).

Figure 11:
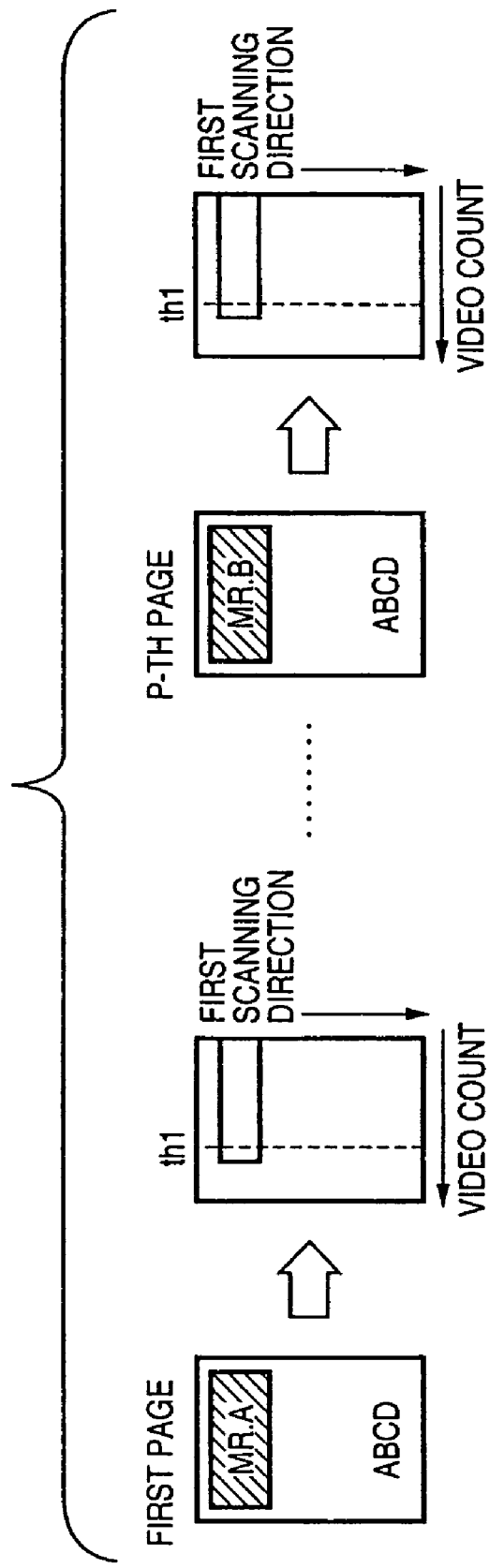
FIG. 11 is a view for explaining acquisition and determination of the video count according to the fourth embodiment.

The CPU 203 instructs the image processing unit 202 to count the video count value of each page (S403). As shown in FIG. 11, the CPU 203 acquires the video count value in the second scanning direction at each position in the first scanning direction (S404). The CPU 203 determines whether there is a count value which exceeds a predetermined threshold th1 (S405). If a count value which exceeds the threshold th1 is detected, the CPU 203 stores the video count value of the page in a memory unit 204 (S406). In accordance with determination in step S407, processing from steps S403 to S406 is repeated by the number P of pages.

Figure 12:
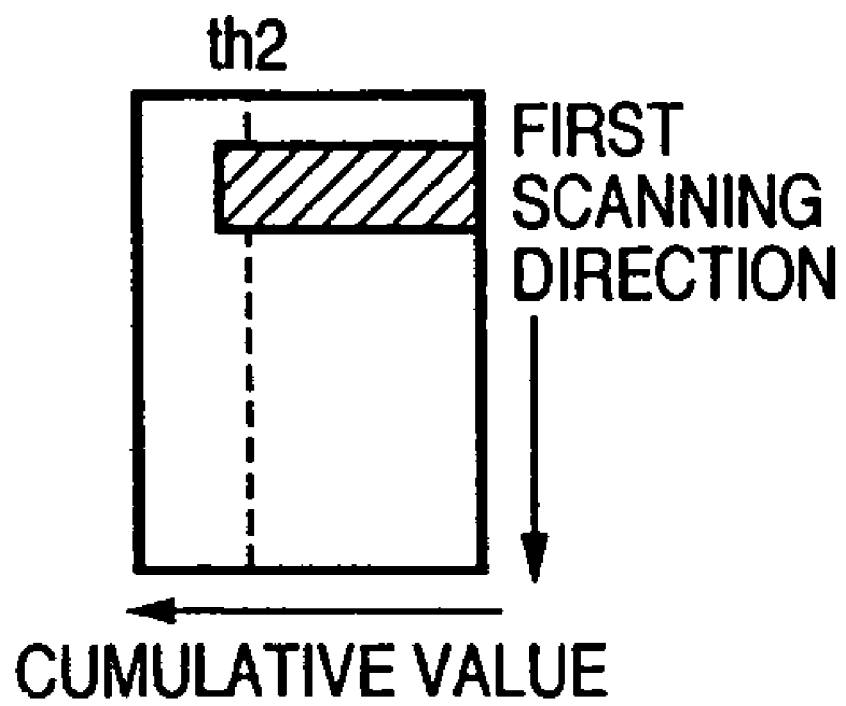
FIG. 12 is a view for explaining the cumulative graph of video count values.

The CPU 203 creates the cumulative graph of video count values as shown in FIG. 12 from video count values stored in the memory unit 204 (S408). The CPU 203 determines whether video count values concentrate in the same area in the first scanning direction (S409). The presence of an area where video count values exceeding the threshold concentrate means that the density of image data is biased. For example, there is image data in which the same background is used over a plurality of pages and the background density is biased, like image data created by Power Point® available from Microsoft. Also, there is image data in which only the character string changes every page, as shown in FIG. 11.

If no video count value concentrates, the CPU 203 instructs the image processing unit 202 to execute a print job (S412). If video count values concentrate, the CPU 203 compares the cumulative value in the concentrated area with a threshold th2 (S410). If the cumulative value<the threshold th2, the CPU 203 instructs the image processing unit 202 to execute the print job (S412).

If the cumulative value≧the threshold th2, the CPU 203 instructs the image processing unit 202 to rotate the image output direction every predetermined number Nt of print sheets (or after the end of the print Job) (S411). Thereafter, the CPU 203 instructs the image processing unit 202 to execute the print job (S412).

In this fashion, when no variable printing is designated but the amount of toner application in the background image or a specific image area is large, the image orientation is rotated every predetermined number Nt of print sheets or after the end of a print Job. Various problems described above that are caused by the density bias of an image can be solved, and high-quality images can be stably printed.

(Modification)

Figure 13:
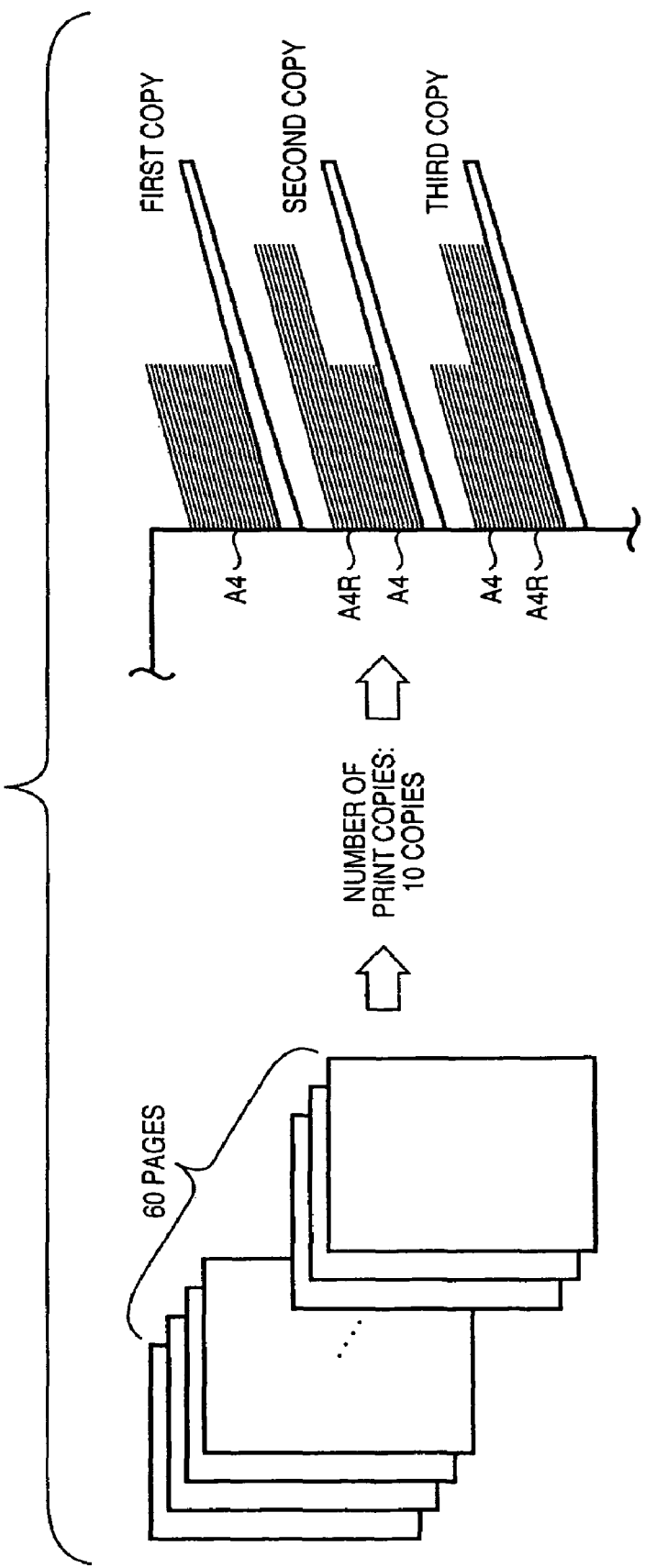
FIG. 13 is a view showing an example in which the output directions of images are uniformed for each group when sorting, stapling & sorting, or bookbinding is designated for a print job.

In the above embodiments, when sorting, stapling & sorting, or bookbinding is designated for a print job, the output directions of images are preferably uniformed for each group, as shown in FIG. 13.

FIG. 13 shows a case wherein image data of 60 pages are printed by 10 copies. For example, if the image output direction is rotated every 100 pages, A4 and A4R undesirably coexist in one print copy (group). In this case, rotation of the image output direction is designated every 60 pages. This setting can prevent coexistence of A4 and A4R in a copy (group).

In the above-described embodiments, if stapling and sorting are designated for a print job, the staple designation position may shift upon 180° rotation. To prevent this, rotation of the image output direction is preferably combined with switching of face-down/up, as shown in FIG. 14.

In FIG. 14, a position 601 is a staple designation position. Note that positions such as an upper left position, lower left position, top, and bottom can be designated as the staple position. When the image output direction is rotated through 180°, the staple-designation position changes to a position 602, so stapling becomes physically impossible. To avoid this situation, 180° rotation is combined with face-down to return the staple designation position to a position 603.

The same result as that shown in FIG. 14 can also be obtained by, while images face up, outputting them in the order of the first image to the 10th image, instead of the order of the 10th image to the first mage, and changing designation of the staple position to "bottom".

FIG. 15 is a view showing an example of image data when the video count value in the first scanning direction does not exceed the threshold th1 but that in the second scanning direction is large. In other words, such image data has an area where video count values concentrate in the second scanning direction. In the image data shown in FIG. 15, the amount of toner application is large on the leading edge side of print paper in conveyance, and thus the print paper may not be separated from the fixing roller. To avoid this, when the video count value exceeds a threshold th3 at the leading edge of an image (image formation start area in the second scanning direction) in the print paper feed direction, the output directions of all images are rotated through 180° from the first to final images of a print job, thereby changing the portion having a large amount of toner application to the trailing edge of an image in the second scanning direction (in the feed direction). This setting can reduce the possibility at which print paper cannot be separated from the fixing roller and is entangled in the fixing unit.

Other Embodiment

The present invention may be applied to a system including a plurality of devices (e.g., a host computer, interface device, reader, and printer) or an apparatus including a single device (e.g., a copying machine or facsimile apparatus).

The object of the present invention is achieved even by supplying a storage medium (or recording medium) which records software program codes to implement the functions of the above-described embodiments to the system or apparatus and causing the computer (or CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) or the like running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described flowcharts.

As many apparently widely different embodiments of the present invention can be made without departing from the spirit and scope thereof, it is to be understood that the invention is not limited to the specific embodiments thereof except as defined in the claims.

This application claims the benefit of Japanese Applications No. 2005-104366 filed on Mar. 31, 2005 and No. 2006-086312 filed on Mar. 27, 2006, which are hereby incorporated by reference herein in their entirety.

What is claimed is:

1. An image processing equipment comprising:
   a receiving unit which receives a print job from an external apparatus;
   an image processing unit which generates print data corresponding to the print job and supplies the print data to an image forming unit;

a counter which counts a video count value of the print data generated by said image processing unit in a first scanning direction or a second scanning direction;

an acquisition unit which, when a print job which is formed from master data serving as a fixed image and variable data serving as a variable image is designated, acquires a video count value of the master data from said counter;

a comparator which compares the video count value acquired by said acquisition unit with a predetermined threshold value; and a control unit which, when the video count value exceeds the threshold value as a result of the comparison, controls said image processing unit so as to rotate an output direction of the print data every predetermined number of print sheets.

2. The equipment according to claim 1, wherein when the video count value is not more than the threshold value in said comparator, said control unit controls said image processing unit so as to supply, to the image forming unit, CMYK data corresponding to a composition result of the master data and the variable data.

3. The equipment according to claim 1, wherein said control unit further controls said image processing unit so as to supply, to the image forming unit, CMYK data corresponding to a composition result of the master data and the variable data.

4. The equipment according to claim 1, wherein after said acquisition unit acquires the video count value, said counter clears the video count value counted by said counter.

5. The equipment according to claim 1, further comprising a memory unit,
wherein when the video count value is held in said memory unit, said acquisition unit acquires the video count value from said memory unit, and when the video count value is not held in said memory unit, said acquisition unit stores, in said memory unit, the video count value acquired from said counter.

6. The equipment according to claim 1, wherein for a print job having designation of sorting, stapling and sorting, or bookbinding, said control unit instructs said image processing unit to rotate an image output direction every print copy.

7. The equipment according to claim 6, wherein for a print job having a designation of stapling and sorting, said control unit instructs said image processing unit to combine rotation of the image output direction and switching of face-down/up.

8. An image processing equipment comprising:
a receiving unit which receives a print job from an external apparatus;
an image processing unit which generates print data corresponding to the print job and supplies the print data to an image forming unit;
a counter which counts a video count value of the print data generated by said image processing unit in a first scanning direction or a second scanning direction, and accumulates video count values of a predetermined number of print data; and
a control unit which acquires the video count value from said counter, and when the video count value exceeds a threshold value, controls said image processing unit so as to rotate an output direction of the print data every predetermined number of print sheets.

9. The equipment according to claim 8, wherein when the video count value is not more than the threshold value, said control unit controls said image processing unit so as to supply, to the image forming unit, CMYK data corresponding to the print data.

10. The equipment according to claim 8, wherein after said control unit designates rotation of the print data, said counter clears the counted video count value.

11. An image processing equipment comprising:
a receiving unit which receives a print job from an external apparatus;
an image processing unit which generates print data corresponding to the print job and supplies the print data to an image forming unit;
a comparator which, upon reception of a print job of image data of not less than a predetermined number of pages, counts a video count value of the print data of each page in a first scanning direction or a second scanning direction, and compares the video count value with a first threshold value; and
a control unit which controls said image processing unit so as to rotate an output direction of the print data on the basis of a comparison result of said comparator every predetermined number of print sheets or after an end of the print job.

12. The equipment according to claim 11, wherein said control unit controls said image processing unit so as to, when the video count value exceeds the first threshold value, accumulate video count values of pages that exceed the first threshold value, and when the accumulated count value is larger than a second threshold value, rotate an image output direction every predetermined number of print sheets or after the end of the print job.

13. The equipment according to claim 11, wherein said control unit controls said image processing unit to detect, from a counting result of the video count value of each page, a presence of an area where video count values concentrate in an image forming start area of the image forming unit in the second scanning direction, and when the video count value in the area exceeds a second threshold value, rotate an image output direction of all pages of the print job through 180°.

14. An image processing equipment comprising:
an input unit which inputs a print job;
an image processing unit which generates print data corresponding to the input print job and supplies the print data to an image forming unit;
a counter which counts a video count value of the print job in a first scanning direction or a second scanning direction;
a comparator which acquires the video count value from said counter and compares the video count value with a predetermined threshold value; and
a control unit which controls said image processing unit so as to rotate an output direction of the print data on the basis of a comparison result of said comparator.

15. The equipment according to claim 14, wherein when the video count value exceeds the threshold value in said comparator, said control unit controls said image processing unit so as to rotate the output direction of the print data every predetermined number of print sheets or after an end of the print job.

16. An image processing method comprising steps of:
inputting a print job;
generating print data corresponding to the input print job and supplying the print data to an image forming unit;
counting a video count value of the print data in a first scanning direction or a second scanning direction,
when a print job which is formed from master data serving as a fixed image and variable data serving as a variable image is designated, acquiring the video count value, and comparing the video count value with a predetermined threshold value; and controlling to, when the video count value exceeds the threshold value, rotate an output direction of the print data every predetermined number of print sheets.

17. An image processing method comprising steps of:

inputting a print job;

generating print data corresponding to the input print job and supplying the print data to an image forming unit;

counting a video count value of the print data in a first scanning direction or a second scanning direction, and accumulating video count values of a predetermined number of print data;

acquiring the video count value and comparing the video count value with a predetermined threshold value; and controlling to, when the video count value exceeds the threshold value as a result of the comparison, rotate an output direction of the print data every predetermined number of print sheets.

18. An image processing method comprising steps of:

inputting a print job;

generating print data corresponding to the input print job and supplying the print data to an image forming unit;

upon reception of a print job of image data of not less than a predetermined number of pages, counting a video count value of each page of print data in a first scanning direction or a second scanning direction, and comparing the video count value with a threshold value; and controlling to rotate an output direction of the print data on the basis of a result of the comparison every predetermined number of print sheets or after an end of the print job.

* * * * *